(No Model.)

T. A. MYERS.
WATER HEATER AND FILTER.

No. 262,091. Patented Aug. 1, 1882.

WITNESSES.
Geo. K. Storm.
A. H. Brach.

Theodore A. Myers INVENTOR.
By Howard Bros. ATTORNEYS.

UNITED STATES PATENT OFFICE.

THEODORE A. MYERS, OF WHEELING, WEST VIRGINIA.

WATER HEATER AND FILTER.

SPECIFICATION forming part of Letters Patent No. 262,091, dated August 1, 1882.

Application filed December 31, 1881. (No model.)

*To all whom it may concern:*

Be it known that I, THEODORE A. MYERS, a resident of Wheeling, in the county of Ohio and State of West Virginia, have invented certain new and useful Improvements in Water Heaters and Filters for Boilers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to an improvement on the apparatus shown in Letters Patent No. 241,506, granted May 17, 1881, for condensing the exhaust-steam of the engine to heat the water, extract the sediment therefrom, and precipitate the soluble matter held in suspension. In the former invention the stand-pipe into which the water is pumped from the heater was simply an upright tube secured to the side of the filtering-vessel by means of bolts and strap-connections, having a spout at the top passing through the side of the same for the admission of water. The outlet-pipe, extending from the base of the filtering-vessel to the mud-drum, was also attached to the outside of the vessel, entering the same at a point about half-way between the bottom of the vessel and the water-line. This mode of construction was found to be objectionable in several ways, viz: The pipes, being exposed to the air, chilled the water as it passed through them to a greater or less extent, according to the temperature of the atmosphere to which they were subjected; second, it was not convenient, besides being very expensive, to resort to boiler-coverings to protect the pipes; third, in the construction of the apparatus it was found impracticable to connect the stand-pipes with the filter or put the apparatus together complete before sending it to its destination from danger in transportation, and from inconvenience in adjusting the relative positions of the various parts. To overcome these difficulties I now construct the filtering-vessel with the stand-pipe on the inside of the same, passing up through the bottom of the vessel to within a short distance of the top. The outlet-pipe from the filter to the mud-drum also passes through the bottom of the filter and extends upward in the water about half-way to the water-line.

Figure 1:
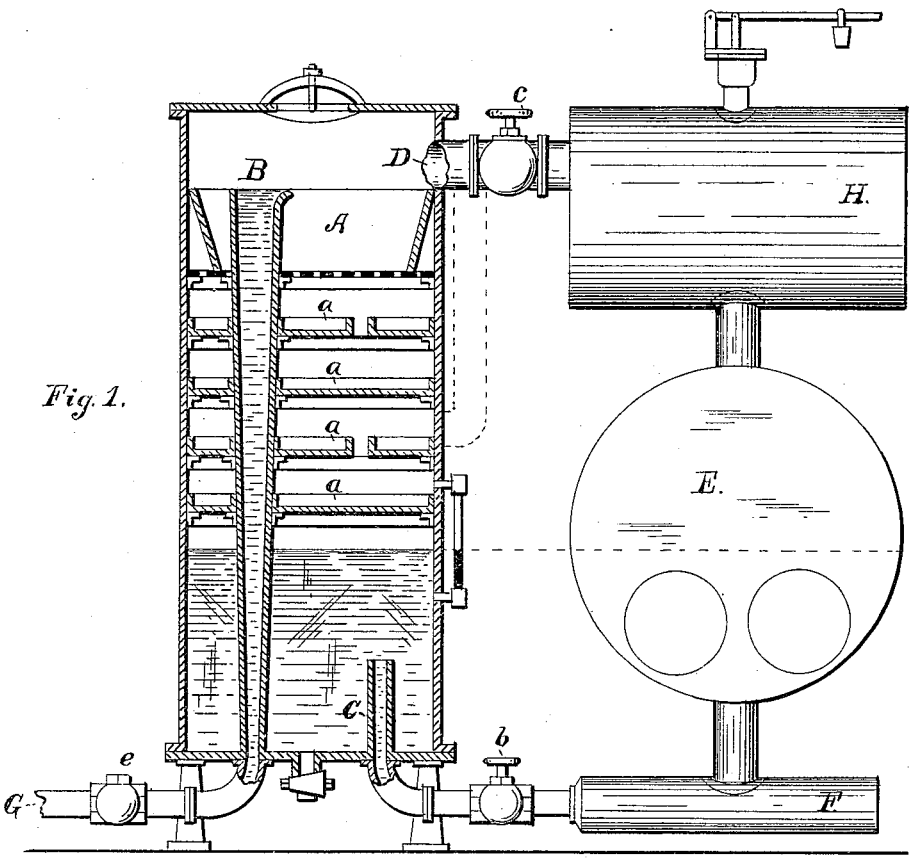
Figure 2:
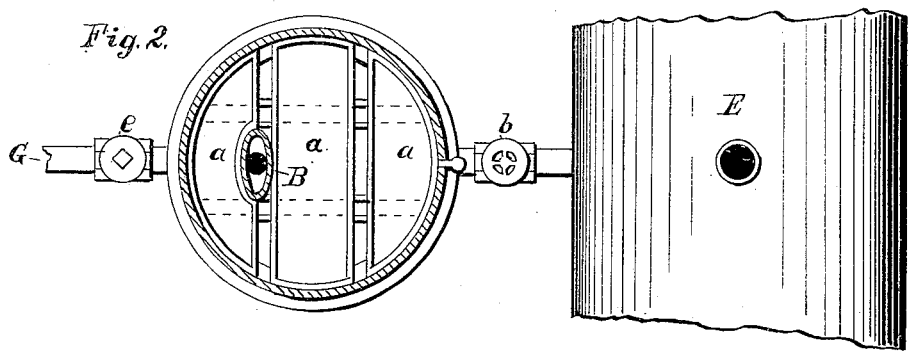

Referring to the drawings, Figure 1 represents a vertical central section of the filtering-vessel and an end view of the boilers and steam-pipe connections. Fig. 2 is a cross-section of the same.

The letter A represents the filtering-vessel; B, the stand-pipe, through which the water flows into the filtering-vessel. The stand-pipe is preferably made an oval shape on the cross-section at the top, and tapering to a circle at the bottom, as shown in Fig. 2, in order that the heat of the filtering-vessel can be more readily imparted to the entire column of water in the stand-pipe, and thus increase its temperature while passing through the same. The pipe is secured to the bottom of the filter by means of a screw-thread connection or any other equivalent manner. The upper end is provided with a lip, in the manner of a pitcher, to guide the contents practically to the center of the vessel.

G is a pipe from the pump to the stand-pipe. *e* is a check-valve.

*a a a* represent a series of pans for catching the water, and by means of the overflow over the edges dividing the column of water into a series of thin sheets. The pans are disposed about the stand-pipe in the manner shown in Fig. 2.

C is the outlet-pipe through which the water is fed to the boilers after it has been filtered and heated to the required temperature. It may be secured to the bottom of the vessel by screw-thread connections or any other well-known means. *b* is a stop-valve to regulate the flow.

D is a steam-pipe from boilers, having a stop-valve, *c*.

E is the boiler; F, mud-drum; H, steam-drum.

By this mode of construction I utilize the heat of the steam and water in the filter to maintain and increase the temperature of the water while passing through the stand-pipe into the filtering-vessel, and while it is passing from there through the outlet-pipe into the mud-drum. The pipes, being on the inside, are not exposed to the air, and consequently do not have to be covered to prevent the consequent decrease in temperature. Another advantage is that the filter can be finished entire with the stand-pipe and outlet-pipe before it leaves the shop. The pipes, being inclosed in the vessel, are not liable to damage in transportation, and the convenience in setting up the apparatus and making the attachments is at once obvious to those versed in the art.

Having described my invention, what I claim, and desire to secure by Letters Patent of the United States, is—

1. The described feed-water heater, consisting of a cylindrical shell, having an upper perforated distributer, series of shallow pans having overflow-openings, a stand-pipe surrounded by the shelves to admit water to a point above the said shelves, a live-steam pipe, D, entering the shell above the perforated distributer, and a discharge-pipe.

2. In a feed-water heater constructed substantially as described, the stand-pipe having the tubular elliptical upper portion tapering to a cylindrical section at the lower end.

In testimony that I do claim the foregoing as my own I hereunto affix my signature in presence of two witnesses.

THEODORE A. MYERS.

Witnesses:
H. H. FICKEZ,
GEO. K. STORM.